United States Patent [19]
Athing et al.

[11] Patent Number: 5,987,498
[45] Date of Patent: Nov. 16, 1999

[54] CREDIT CARD OPERATED COMPUTER ON-LINE SERVICE COMMUNICATION SYSTEM

[75] Inventors: William David Athing; Peter Foster Van Horne, both of San Diego, Calif.

[73] Assignee: Atcom, Inc., San Diego, Calif.

[21] Appl. No.: 08/602,630

[22] Filed: Feb. 16, 1996

[51] Int. Cl.$^6$ .......................... G06F 13/362; G06F 13/42
[52] U.S. Cl. ....................... 709/203; 709/218; 709/219; 709/229; 705/26
[58] Field of Search .................. 395/200.36, 233, 395/611, 651, 200.76, 187.01, 200.96, 200.66, 200.63; 345/177; 364/DIG. 1, DIG. 2; 235/380; 379/89; 380/4, 3, 21, 20, 24, 23, 25, 19; 340/87, 34; 455/4.1, 6.3

[56] References Cited

U.S. PATENT DOCUMENTS

| | | | |
|---|---|---|---|
| 4,902,881 | 2/1990 | Janku | 235/381 |
| 5,008,928 | 4/1991 | Cleghorn | 379/100 |
| 5,093,787 | 3/1992 | Simmons | 395/233 |
| 5,132,671 | 7/1992 | Couis et al. | 345/177 |
| 5,218,633 | 6/1993 | Clagett et al. | 379/144 |
| 5,247,575 | 9/1993 | Spraque et al. | 380/9 |
| 5,265,033 | 11/1993 | Vajk et al. | 395/200.36 |
| 5,272,747 | 12/1993 | Meads | 379/59 |
| 5,333,181 | 7/1994 | Biggs | 379/91 |
| 5,393,964 | 2/1995 | Hamilton et al. | 235/381 |
| 5,396,546 | 3/1995 | Remillard | 379/96 |
| 5,428,785 | 6/1995 | Morel et al. | 395/651 |
| 5,457,680 | 10/1995 | Kamm et al. | 370/332 |
| 5,602,905 | 2/1997 | Mettke | 379/96 |
| 5,699,089 | 12/1997 | Murray | 345/146 |

*Primary Examiner*—Daniel H. Pan
*Attorney, Agent, or Firm*—Heller Ehrman White & McAuliffe

[57] ABSTRACT

A computer network communication system collects messages from multiple electronic sources comprising network service providers and presents them to a system user in a common format that is selectable by the user. The system receives charge account information from the user and thereby recoups costs associated with providing the computer network communication access. Charge account and associated identification information for a user are stored at a central control site, along with a user's preferred display settings. The central control site is connected to an interconnected computer network and to multiple remote sites comprising computer terminals that communicate with the central control site over the computer network. The remote user sites also are capable of direct communication with network service providers independently of the central control site over conventional telephone line connections.

32 Claims, 14 Drawing Sheets

| New system account--Welcome! |

Please use the keyboard to input a unique name for your new system account. For example, you can use a first initial and your full last name.

Account name: ☐

Password: ☐

Repeat password: ☐

| Back | Next | Cancel | Help |

*FIG. 10*

| Payment screen |

Please slide your credit card through the card reader on the right-hand side of the keyboard. After sliding the card, check the information displayed below. If correct, select the "Next" button at the bottom of the screen.

Name on card: ☐

Account No.: ☐

| Back | Next | Cancel | Help |

*FIG. 11*

Account entry

Please enter your system account name and password.

If you don't remember your account name, call the service department at (800) 555-5555, or simply sign up for a new account.

Account name: _____
Password: _____

| Back | Next | Cancel | Help |

*FIG. 14*

Main Menu

Welcome!
Please choose one of the functions below. Don't forget to log-off when you are done.

- Internet Explorer
- AOL
- News Agent
- E-mail
- Games
- Change Account settings
- Change e-mail settings
- Log-off

| Back | Next | Cancel | Help |

*FIG. 15*

E-mail Configuration Wizard

Welcome!
Use this screen to configure the presentation format of your retrieved e-mail. You can select select colors, font, size, etc. by selecting the appropriate boxes:

| Screen colors | Font | Size |

| Text location | Captions |

| Back | Next | Cancel | Help |

*FIG. 16*

Internet Mailbox Information

Personal information

Name:
E-mail address:

Mailbox information

Mail Server:
Account name:
Password:

I don't have an Internet provider account. ☐

| Back | Next | Cancel | Help |

*FIG. 17*

E-mail Display Screen

| Compose | Send | Reply | Delete | |
|---|---|---|---|---|
| From | Subject/Text | | Received | |
| | | | | |

| Back | Next | Cancel | Help | |

*FIG. 18*

CompuServe Interface

CompuServe account information

CompuServe ID: [ ]

Password: [ ]

I don't have a CompuServe account. ☐

| Back | Next | Cancel | Help | |

*FIG. 19*

CREDIT CARD OPERATED COMPUTER ON-LINE SERVICE COMMUNICATION SYSTEM

BACKGROUND OF THE INVENTION

1. Field of the Invention

This invention relates generally to computer networks and, more particularly, to computer network communication systems that send and receive messages.

2. Description of the Related Art

Electronic mail or "e-mail", as it is widely known, refers to messages that are sent from one computer user to another over networks of interconnected computers. Computer systems that support e-mail facilitate such message transfer by providing a means for composing messages, transferring them from the message originator to the intended recipient, reporting back to the originator upon message receipt, and placing messages in the proper format for transmission over the networks. Communicating via e-mail is gaining in popularity relative to more traditional communication methods such as telephone, postal service delivery of hard copy, overnight or expedited courier delivery of hard copy, or electronic facsimile transmission. Communication by e-mail has advantages of immediacy, simultaneous delivery to multiple recipients, convenient storage and retrieval, and relatively low cost, but keeping up with e-mail from potentially many different sources can be problematic.

Interconnected computer networks for exchange of e-mail are both public and private, or proprietary. A large, worldwide collection of interconnected computer networks that is publicly accessible is commonly referred to as the "Internet" and generally comprises a group of computers that communicate with each other according to an "Internet Packet" (IP) communication protocol also referred to as TCP/IP. The Internet incorporates literally thousands of smaller computer networks. In North America, the Internet includes a "backbone" of supercomputer centers that are directly connected to each other by extremely high speed fiber optic cables. Each supercomputer center includes large mainframe computers of very high sophistication and operating capability that can send and receive a large number of e-mail messages. Regional Internet service providers are geographically distributed across the continent and are connected by high speed communication lines to the nearest supercomputer center. Users are connected to one of the regional Internet service providers to gain access to the Internet and its message handling and information exchange features.

Private e-mail systems include corporate networks in which the staff of corporations can exchange messages, such as the well-known International Business Machines Corporation (IBM Corporation) "OfficeVision" and "PROFS" systems and the "CC: Mail" system used by many companies, and also the e-mail services of various on-line service providers. The on-line services presently include providers such as America On-Line (AOL), CompuServe, SprintMail, MCI Net, Microsoft Network, and the like. Subscribers to on-line services pay a subscription fee for on-line services and typically also can access the Internet through the on-line service provider, so that subscribers can send and receive messages over the Internet from non-subscribers.

Internet e-mail messages are sent and received with reference to an electronic e-mail domain address that identifies routing information to the Internet infrastructure. Thus, a user will have a different e-mail address for each regional service provider with which the user is associated. For example, it is not unusual for a person to have different e-mail addresses for a corporate e-mail mailbox, a mailbox through an Internet service provider, and mailboxes with several on-line service providers. The person can potentially send and receive messages through each one of these e-mail mailboxes. Checking each of these mailboxes for messages can be inconvenient and time consuming, making it relatively easy to experience considerable delay in receiving a message or a response to a message, or even missing a message completely. Moreover, establishing communication with each Internet provider or on-line service requires a different procedure and data entry.

In addition, checking each of various e-mail mailboxes can be difficult when away from one's primary computer terminal. For example, many persons perform their primary e-mail sending and receiving from a computer at an office location. If a person has no portable computer with a modem, it can be impossible to check for e-mail when away from that office. Alternatively, it will be necessary to gain temporary use of a computer at another location to check for e-mail. This also can be difficult.

Finally, some potential users of e-mail services may be without computer equipment to gain access to the Internet or might prefer to gain access through a computer other than their primary terminal. Such users might be inclined to use computer equipment from a third-party provider, but that is impractical unless the third-party can be assured of having convenient, reliable payment from the user.

From the discussion above, it should be apparent that there is a need for a computer network communication system that permits more convenient checking of e-mail and more convenient communication with multiple e-mail service providers, thereby reducing the difficulty of keeping up with multiple e-mail mailbox locations and assisting third-party providing of e-mail services. The present invention satisfies this need.

SUMMARY OF THE INVENTION

In accordance with the invention, a computer network communication system collects messages from multiple electronic sources comprising network service providers and presents them to a system user in a common format that is selectable by the user after first receiving charge account information from the user such that the provider of the communication system can recoup costs associated with providing the system. Charge account and associated identification information for a user can be stored at a central control site for faster and more convenient operation at subsequent log-on sessions and a user's preferred display settings can be stored and retrieved as well. If a user does not subscribe to an e-mail service, the system provider can act as a third-party provider. In this way, the network communication system permits more convenient checking of e-mail and more convenient communication with multiple e-mail service providers, thereby reducing the difficulty of keeping up with multiple e-mail mailbox locations and assisting third-party providing of e-mail services. The central control site is connected to an interconnected computer network and to multiple remote sites comprising computer terminals that communicate with the central control site over the computer network. The remote user sites also are capable of direct communication with network service providers independently of the central control site over conventional telephone line connections.

In one aspect of the invention, an e-mail scraping function is provided wherein the system receives information from a user concerning network service providers through whom the user might receive e-mail. For the duration of a log-on session during which the user is making use of the system, the system will automatically periodically check the identified network service providers to determine if the user has received any e-mail messages. User security information is received from the user at the remote site and is provided to the appropriate network service providers during the course of the log-on session. The security information preferably is stored at the remote site only for the duration of the log-on session. At the end of the session, the information is deleted. This ensures maximum data security of the user password data.

In another aspect of the invention, user configuration information is stored at the central control site and is retrieved each time the user begins a log-on session. The configuration information includes account and identification information for the user with each of designated network service providers. When a user begins a log-on session, the account information is retrieved and the user can be queried for security information, such as a password necessary to establish communication with each designated network service provider. During the log-on session, the system automatically establishes communication with each designated network service provider and transmits the password information. In this way, the amount of information that must be collected from the user for the e-mail scraping feature is minimized while user security is not compromised. If desired, the user configuration information can include display settings for each of the network service providers.

Other features and advantages of the present invention should be apparent from the following description of the preferred embodiment, which illustrates, by way of example, the principles of the invention.

BRIEF DESCRIPTION OF THE DRAWINGS

FIG. 10 is a display screen representation showing the new user data screen display at one of the terminals illustrated in FIG. 4.

FIG. 11 is a display screen representation showing the payment collection screen display at one of the terminals illustrated in FIG. 4.

FIG. 14 is a display screen representation showing the existing user identification screen display at one of the terminals illustrated in FIG. 4.

FIG. 15 is a display screen representation showing the main menu screen display at one of the terminals illustrated in FIG. 4.

FIG. 16 is a display screen representation showing the e-mail configuration screen display at one of the terminals illustrated in FIG. 4.

FIG. 17 is a display screen representation showing the mailbox screen display at one of the terminals illustrated in FIG. 4.

FIG. 18 is a display screen representation showing the e-mail message screen display at one of the terminals illustrated in FIG. 4.

FIG. 19 is a display screen representation showing the network service provider screen display for the "CompuServe" service at one of the terminals illustrated in FIG. 4.

DESCRIPTION OF THE PREFERRED EMBODIMENT

Figure 1:
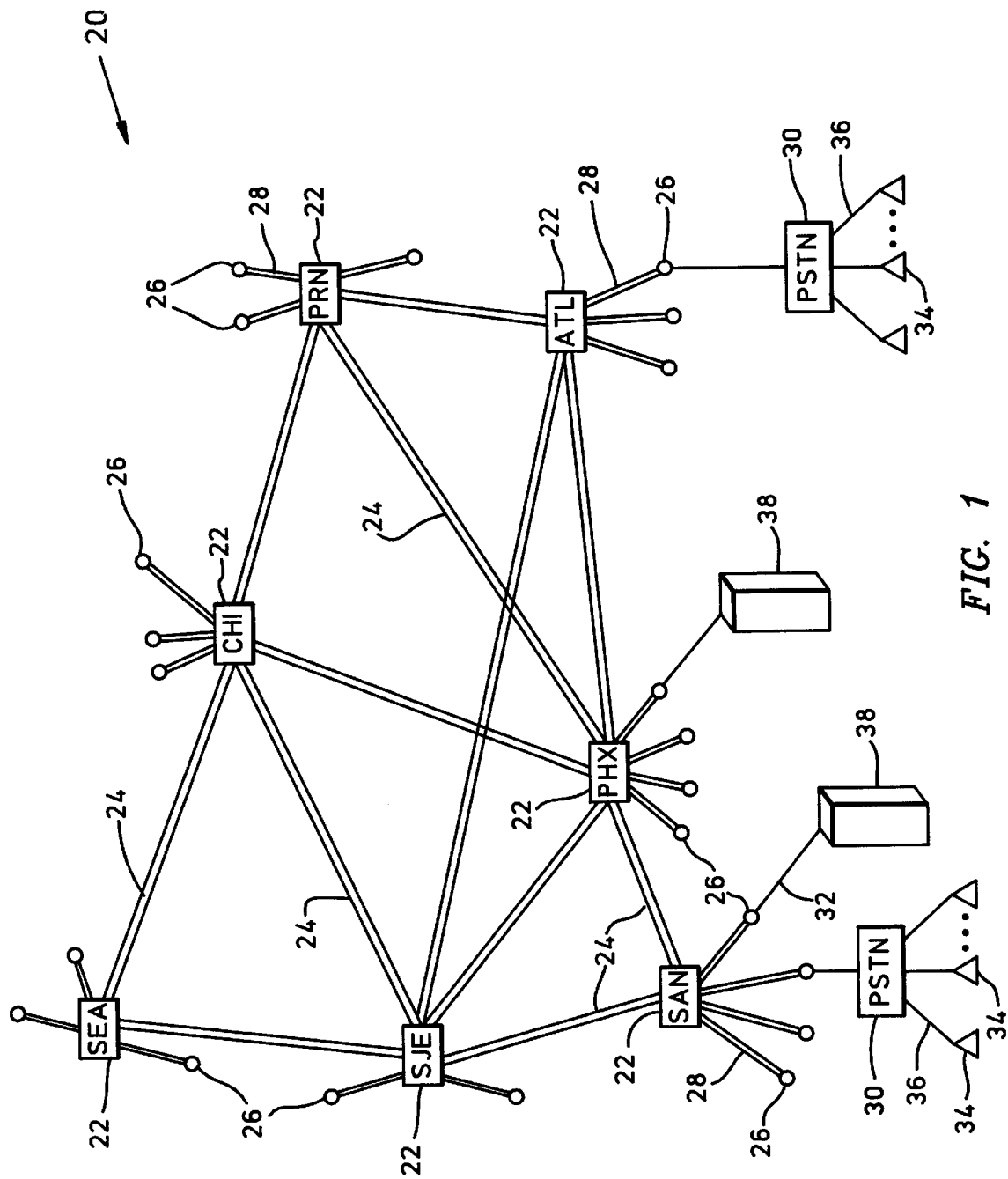
FIG. 1 is a diagram of a computer network with which the system of the preferred embodiment operates.

FIG. 1 is a representation of the interconnected computer network 20 with which the system of the present invention operates. The network is shown geographically distributed throughout the U.S.A. and is more commonly referred to as the "Internet". FIG. 1 shows that the computer network 20 includes several so-called "supercomputer" centers 22 distributed across the North American continent, the centers including one in Seattle, Wash., represented by "SEA"; one in San Jose, Calif., represented by "SJE"; one in San Diego, Calif., represented by "SAN"; one in Phoenix, Ariz., represented by "PHX"; one in Chicago, Ill., represented by "CHI"; one in Atlanta, Ga., represented by "ATL"; and one in Princeton, N.J., represented by "PRN". The supercomputer centers 20 are interconnected by direct high-speed network lines 24, typically constructed of fiber optic cable for extremely high speed and reliability. A fiber optic cable, for example, can typically accommodate data transmission rates of 2 gigabits (GB) per second. Connected to each supercomputer center are a plurality of regional Internet service providers 26 that communicate with their respective supercomputer centers over relatively high speed lines 28 such as ISDN or T1 lines. Typical data rates for ISDN lines are 56 Kbits/second to 112 Kbits/second and typical data rates for T1 lines are 1.44 Mbits/second.

Each regional Internet service provider 26 is connected to individual users through a public switched telephone network (PSTN) interface 30 via data lines 32. The system of the preferred embodiment includes terminals at remote sites 34 that are connected to the PSTN 30 through conventional telephone lines 36, which typically carry data at a maximum data rate of 28.8 Kbits/second. The communication system of the present invention also includes central control sites 38, one of which constitutes a primary central control site and the other of which constitutes a back-up, secondary central control site. The control sites are connected to the nearest regional Internet service provider 26 through the high-speed lines 32.

In accordance with the invention, users can log-on to the system and thereby gain access to multiple network service providers such as on-line services and e-mail providers through a common graphical user interface (GUI) that permits storage and retrieval of a user-selected GUI presentation configuration. Once a user has completed the log-on procedure and established a log-on session of communication with a central control site, the system will collect security information (such as a user password) for the e-mail services with which the user has registered. These e-mail services will be continuously checked and any e-mail messages for the user will be collected and provided to the user at a remote site terminal. Such operation comprises an e-mail scraping function that continues for the duration of the user log-on session. When the user decides to log-off the system, the remote terminal is cleared of security information such as the user password, targeted messages (if any) are displayed at the remote site terminal screen, and billing charge information is provided. The system thereby provides a convenient way to store user configuration data, check on and retrieve e-mail, and maintain security and privacy.

Figure 2:
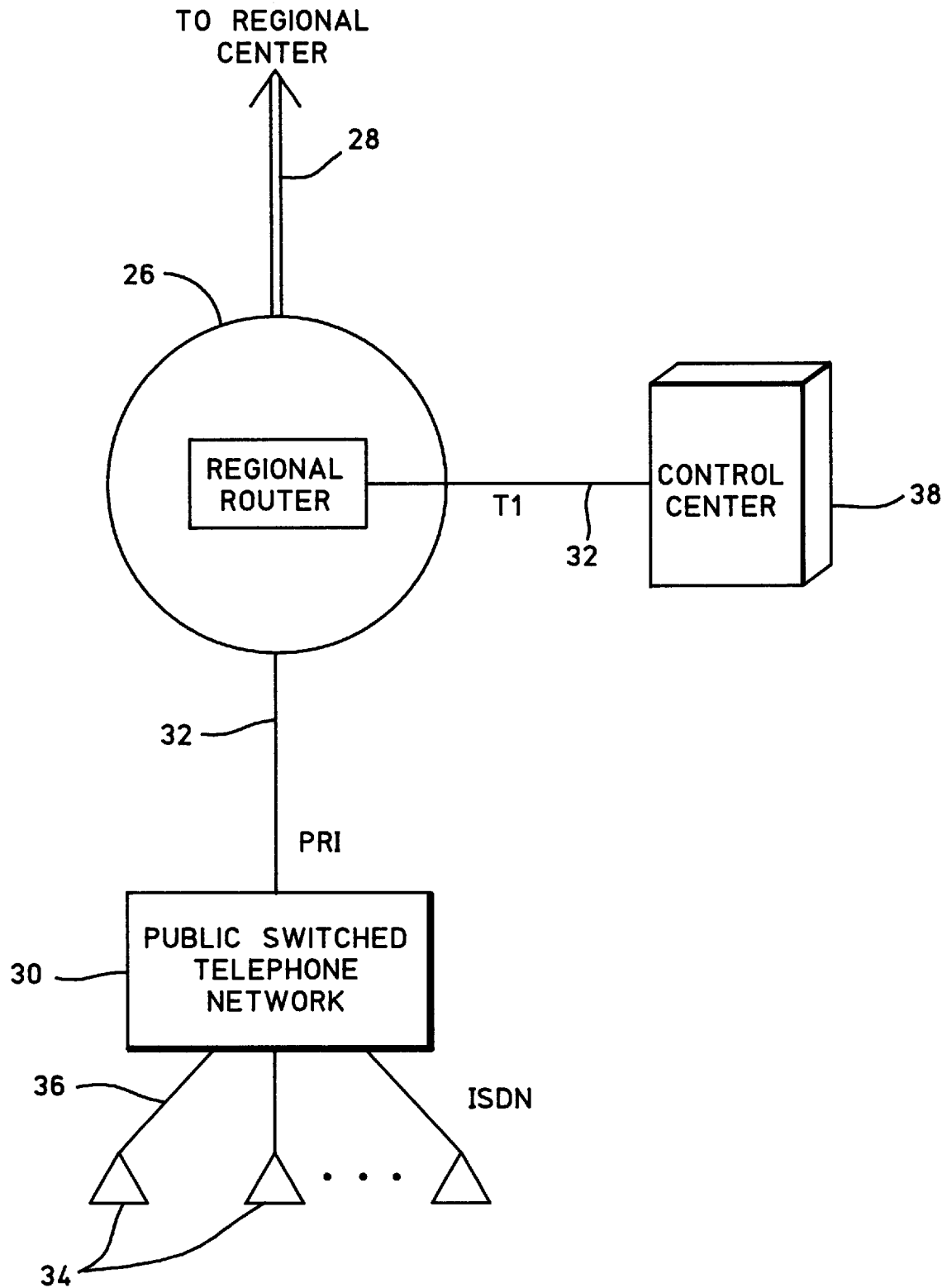
FIG. 2 is a diagram that illustrates details of the devices interconnected at a regional center of the system illustrated in FIG. 1.

FIG. 2 shows details of the system components and the existing structure of the Internet. Users at remote sites 34 communicate with their respective on-line services through ISDN lines 36 connected to the PSTN 30, which in turn are connected to a nearby regional Internet service provider 26. The central control site 38 communicates with the users through the regional Internet service provider. If users are connected to a regional Internet service provider different from that connecting the central control site computers, then the central control site may have to communicate with the users through the regional Internet service provider and a supercomputer center over the high-speed lines 28. In this way, much of the communication between users and the central control sites, between users and their on-line services, and between individual users of the system can occur over the Internet itself, and therefore at minimal communication cost.

Figure 3:
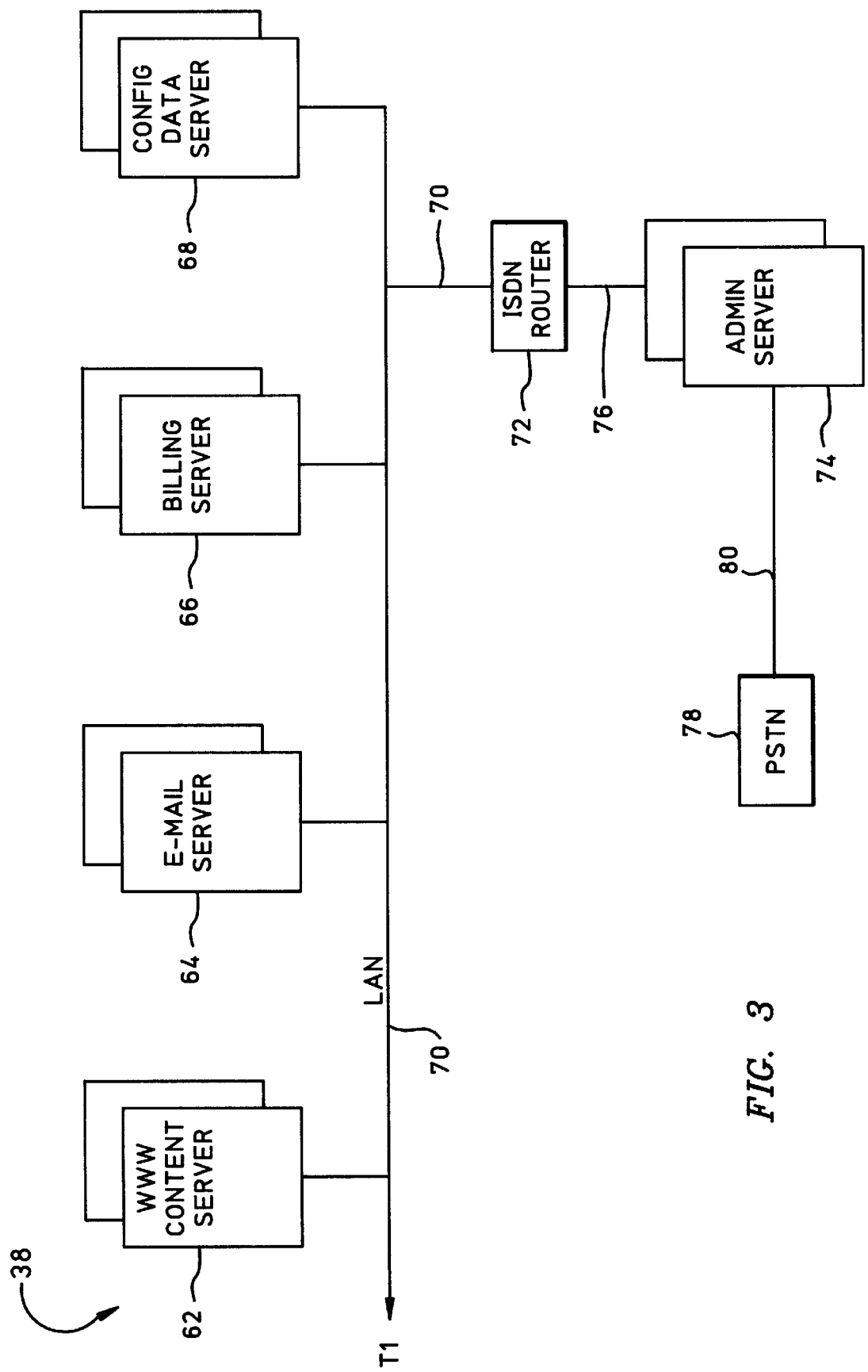
FIG. 3 is a block diagram of one of the control centers illustrated in FIG. 2.

FIG. 3 is a block diagram of a central control site 38, showing that the central control site includes multiple computer processors that perform a variety of functions. The processors include a World Wide Web content server, abbreviated in the drawings as WWW content server 62. This server permits the user to receive a variety of multimedia displays on the terminal. The central control site also includes an e-mail server 64, which has the function of providing the proper commands to a user's e-mail service so e-mail messages can be retrieved. The central control site also includes a billing server 66 that verifies a user's identity and debits the user's charge account at the end of the log-on session. Finally, the central control site includes a configuration data server 68 that collects user information concerning preferred display configuration and the like and retrieves saved user configuration display data.

Each of the FIG. 3 servers 62, 64, 66, 68 will typically comprise a dual processor machine having, for example, two "Pentium PRO" integrated circuit chip processors manufactured by Intel Corporation, Santa Clara, Calif.. That is, each server comprises a primary machine and includes a back-up machine that duplicates the configuration of the primary machine. In this way, there is built-in redundancy so that failure of the primary machine should not hamper operation of the system. Each of the servers is shown in the drawing with a "shadow" server behind the first server to indicate the built-in redundancy. The dual processor machine of each server typically will have approximately 256 megabytes (MB) of random access memory (RAM) and a high speed data storage device, such as a hard disk drive, with approximately 8,000 MB (8 gigabytes, or 8 GB) of memory. The various servers are interconnected via a local area network (LAN) 70 of the central control site. A high-speed data line 70 connects an ISDN router 72 to the central control site (labelled "T1" in FIG. 2), which in turn is connected via high-speed lines 76 to an administrative server. The administrative server takes care of targeted messages upon the end of a log-on session, timely messages to the user, and the like.

Figure 4:
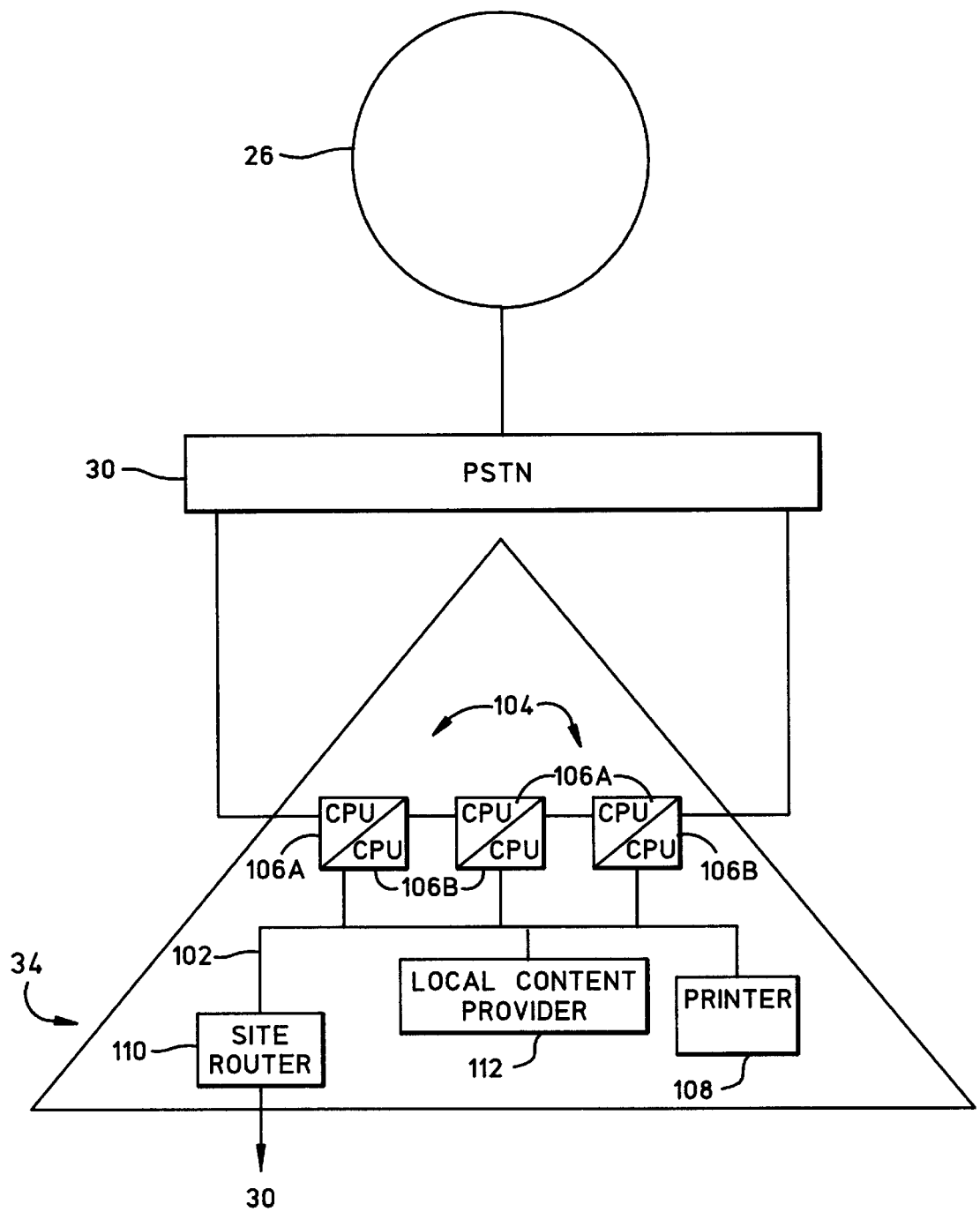
FIG. 4 is a block diagram of one of the remote sites illustrated in FIG. 2.

FIG. 4 is a block diagram of a remote user site 34, which shows that a remote user site includes a LAN 102 that connects multiple remote site stations 104 of the remote site. In the preferred embodiment, each remote site station will include two terminals, each of which includes a computer processor, that are positioned conveniently within a single housing. That is, each remote site station includes a first central processor unit 106A and a second central processor unit 106B. Each remote site also can include an optional printer 108, for use by the terminal users of the site. The users at one or more remote site stations can share the same printer. The remote user site 34 also includes a site router 110 that is responsible for routing e-mail from a remote site user to persons having a mail box address with an on-line service provider or an Internet e-mail service provider. FIG. 4 also shows the computer installations 104 of the remote site are connected to the PSTN 30 over the ISDN lines 36.

Figure 5:
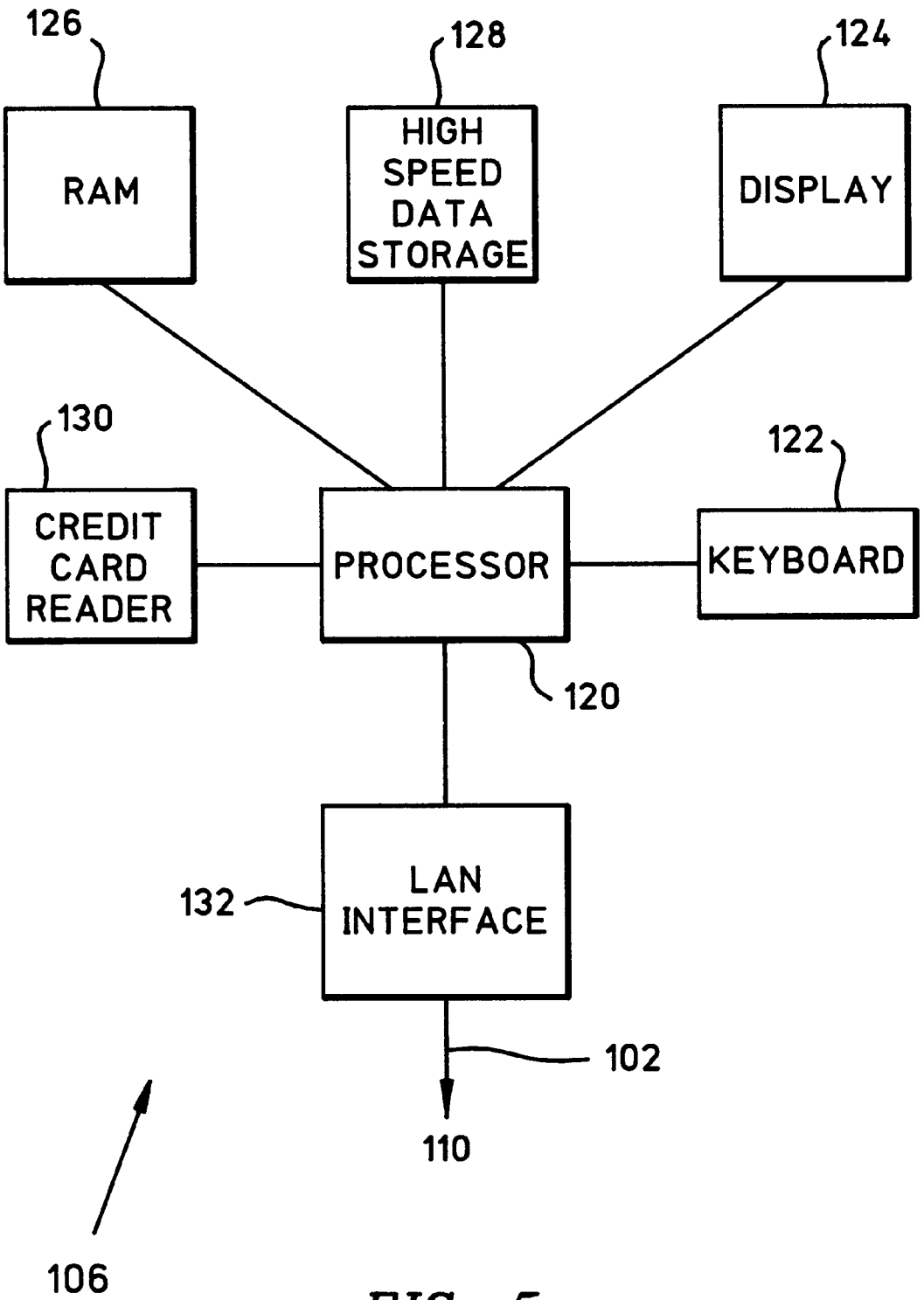
FIG. 5 is a functional block diagram of one of the terminals illustrated in FIG. 4.

FIG. 5 is a block diagram that shows details of a processor unit 106 in a remote site terminal. It is to be understood that each processor unit 106A, 106B of FIG. 4 has a construction identical to that of the unit 106 illustrated in FIG. 5. Each processor unit includes an integrated circuit chip microprocessor 120 such as a "Pentium" processor manufactured by Intel Corporation, Santa Clara, Calif.. Connected to the processor are a keyboard 122 for data input by a user, a display device 124 such as a video monitor for display of information to the user with a display pointer device such as a display mouse, track ball, or touch-sensitive screen pointing device, a block of random access memory (RAM) storage 126, a high speed data storage device 128 such as a magnetic or magneto-optical hard disk drive of 1 GB capacity or more, and a credit card reader 130 for automatically reading charge account information from the credit card of the user.

The credit card reader 130 preferably comprises a conventional reader having a slot through which the user slides the magnetically encoded stripe of a credit card. The reader includes a magnetic head that reads the charge account information on the user's credit card and provides the account information to the processor 120. After receiving the charge account information, the processor uses programming stored in the high speed data storage device or RAM to process the charge account information. Thus, the processor sends the information through a LAN/networking interface 132 of the remote site 34 to the site router 110 (FIG. 4) and then on to the public switched telephone network (PSTN) for charge approval from a commercial clearing house or other credit approval agency. The interface 132 also can be used to communicate with the central site. The processor 120 preferably permits the continuation of the log-on session pending charge approval from the credit approval agency. If charge approval is not received, the processor can request that the user try the card again or present a new card for approval. If approval is not received after a predetermined time limit, the processor can automatically terminate the log-on session. Such credit card processing will be carried out by application programs stored in the processor RAM 126 or high speed data storage device 128 at the remote site.

Figure 6:
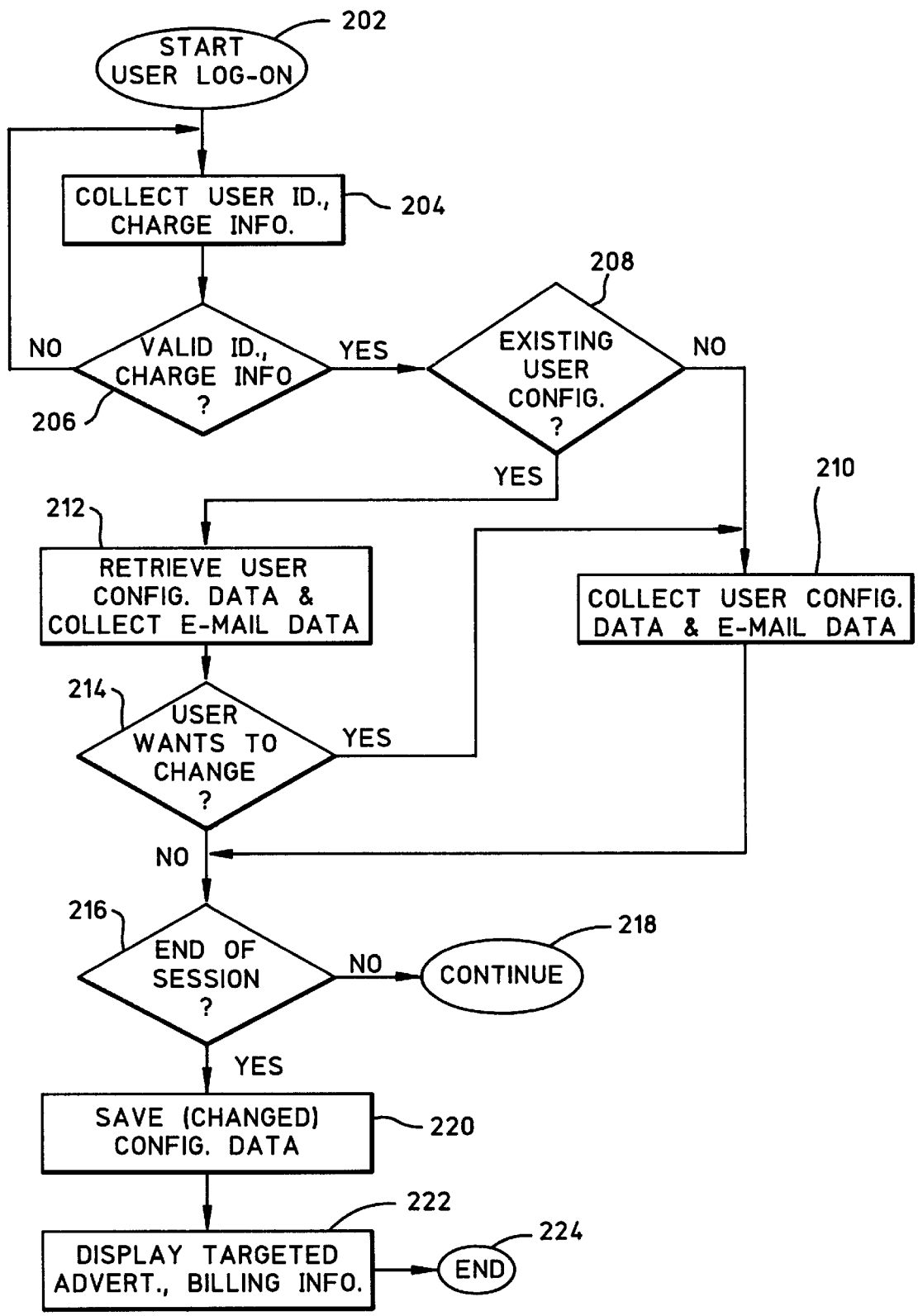
FIG. 6 is a flow diagram that illustrates the operating steps carried out by the system illustrated in FIG. 2 when a user performs a log-on procedure and the selected configuration is saved.

FIG. 6 is a flow diagram that illustrates the operating steps carried out by the system illustrated in FIG. 2 when a user at a remote terminal performs a log-on procedure to begin a log-on session of communication with a central control site. The log-on procedure begins with user action at a terminal, indicated by the start box labelled 202 in FIG. 6. The next processing step, as represented by the flow diagram box numbered 204, is to collect the user identification and charge information. This processing step involves receiving user keyboard input providing a user name or other user identification data and also receiving charge data such as a credit card account number. The charge data can be received through the card reader. Verification of credit card number and account status can be easily handled by conventional credit card reporting agencies. If valid user identification or charge data is not received, then the system returns to the flow diagram box numbered 204. An error message can be displayed if processing returns after a predetermined number of tries. Processing otherwise proceeds to the next processing box, numbered 208.

At the flow diagram box numbered 208, the system determines if the user whose identity was validated has previously stored preferred user configuration data. Such user configuration data would include the names of those on-line network service providers from whom the user desires to collect e-mail. If user configuration data has not been stored, indicating that this is an initial log-on procedure being tried out by the user, then such information is collected, along with e-mail data for the current log-on session. This processing is represented by the flow diagram box numbered 210. The user configuration data includes screen formats and screen colors that are selected by the user. The e-mail data includes the e-mail user passwords for the various on-line services. Processing then continues, in accordance with user action.

If the user has previously completed the log-on procedure and stored configuration data, an affirmative outcome at the decision box numbered 208, then the system retrieves the user configuration data and collects the e-mail data described above. The configuration retrieval processing step is represented by the flow diagram box numbered 212. After the user configuration data is retrieved from the central control site, the system queries the user to determine if any changes in the user configuration are desired. This query is represented by the decision box numbered 214, labelled "User Wants to Change?" If a change is desired, an affirmative outcome at the box 214, then processing moves from box 214 to box 210. If no change is indicated, a negative outcome at the box numbered 214, then processing continues to the decision box numbered 216, where the system checks to determine if the user has indicated a desire to end the log-on session. When processing reaches the decision box numbered 216, the log-on procedure processing is completed and normal operation of the log-on session begins.

If the user does not wish to end the log-on session, a negative outcome at the decision box numbered 216, then processing continues with further processing steps in accordance with user action, as indicated by the continuation box 218. The user action can comprise, for example, checking e-mail, sending e-mail, "surfing" the World Wide Web, using an on-line service, or playing computer games. If the user is ending the log-on session, an affirmative outcome at the decision box 216, then processing moves to the flow diagram box numbered 220, which indicates that changed configuration data is saved. It should be understood that saving the changed configuration data could be performed at the time the changed configuration is collected (see the flow diagram box numbered 210), rather than waiting for the end of the log-on session.

After the configuration data has been saved, the preferred embodiment permits display of targeted advertising at the terminal display device and also display of billing information for the user. Such targeted advertising can comprise, for example, advertising that is produced by a local content processor at the remote site based on local conditions, an advertisement retrieved from a predetermined library of advertising, or a message based on user demographic information. Finally, billing information, such as a summary of the charges incurred by the user and charged to the user's account, is displayed. The log-on session is then terminated and communication with the central control site is terminated; this is indicated by the End box numbered 224 in FIG. 6.

Figure 7:
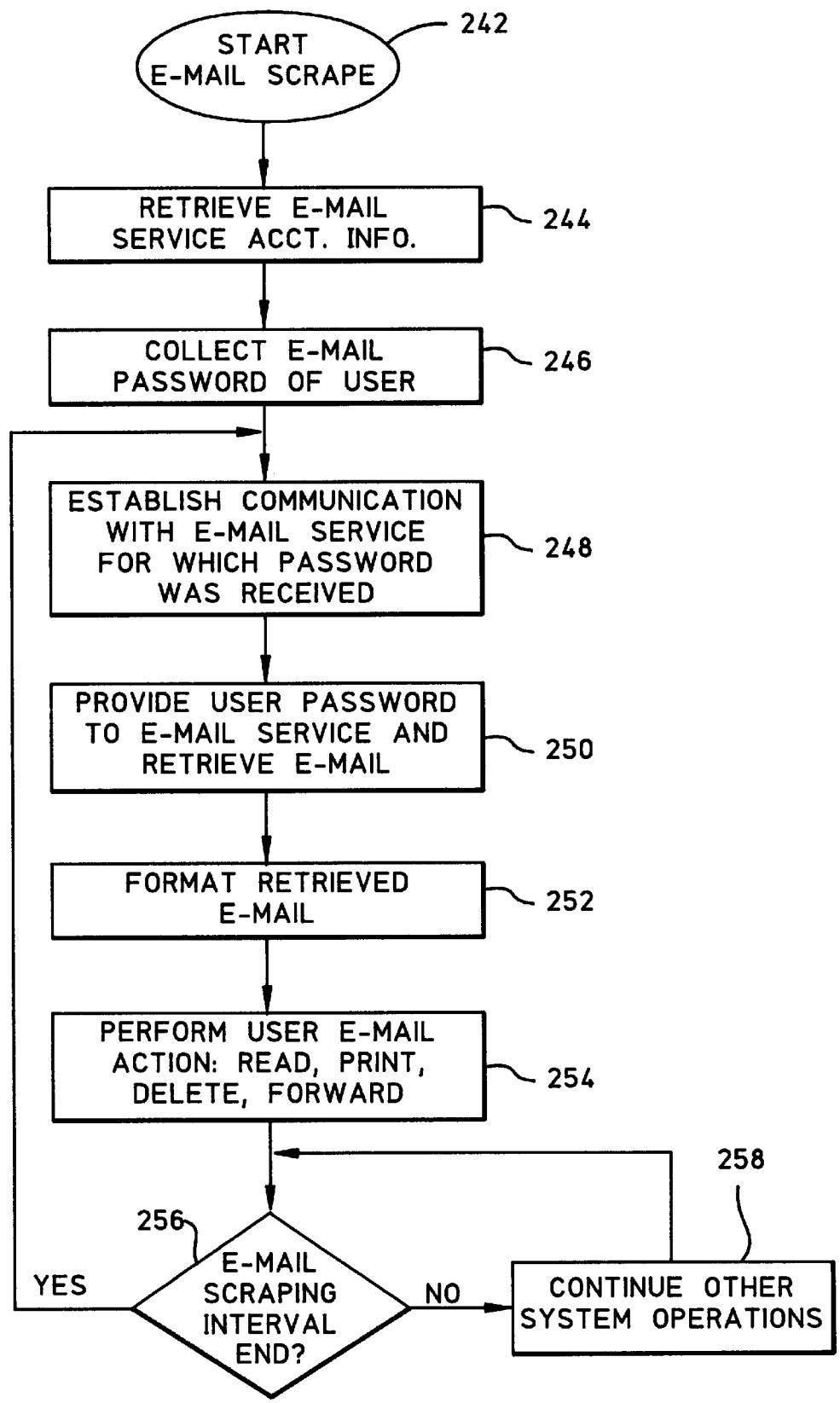
FIG. 7 is a flow diagram that illustrates the operating steps carried out by the system illustrated in FIG. 2 when e-mail scraping is performed.

In accordance with the present invention, a user can perform e-mail message "scraping" to collect messages from a variety of e-mail network service providers and review e-mail messages in a common format. FIG. 7 is a flow diagram that illustrates the operating steps carried out by the system when e-mail scraping is performed.

The start of the e-mail scraping is indicated in FIG. 7 at the flow diagram box numbered 242. The first step of the process is to retrieve the user account information for each e-mail network service provider that the user wants to have checked, as represented by the flow diagram box numbered 244. A list of e-mail services to be checked is derived from the user configuration information described in conjunction with the log-on procedure description of FIG. 6. As noted above, the user configuration information is saved in the configuration data at the central control site or is derived from the information collected at the beginning of the current log-on session. As indicated by the flow diagram box numbered 246, for each e-mail service to be checked, the system collects appropriate security information such as e-mail passwords from the user or collects other information needed to retrieve e-mail, as dictated by the particular e-mail service.

The present invention is intended to permit retrieval of e-mail messages from a variety of e-mail network service providers. Some of the presently better-known service providers include America On-Line, Microsoft Network, CompuServe, Prodigy, MCI Mail, and private e-mail networks such as the "OfficeVision" and "PROFS" systems from International Business Machines Corporation. Special-purpose interface application programs stored at the remote site can be invoked to communicate with one or more of these service providers. In the preferred embodiment, the processing of box 246 utilizes the user's account with the service provider to collect e-mail messages. Thus, billing charges for communicating with the user's e-mail network service provider will appear on the user's account statement from the service provider. No separate billing from the communication system provider of the current invention will be necessary for this service.

Next, the system establishes communication with each e-mail network service provider for whom e-mail is to be checked. This processing is represented by the flow diagram box numbered 248. The user password or other data needed to retrieve mail from each e-mail service provider is then provided to each e-mail service provider. This processing is represented by the flow diagram box numbered 250. In the preferred embodiment, e-mail service provider password information is collected from a user once at the beginning of every log-on session. The information is not collected again before user log-off. It is preferable to collect the information once every log-on session rather than store the information with the user configuration data because this ensures greater user privacy and security. The security information will be collected anew, however, at the next log-on session initiated by the user.

After an e-mail message is retrieved from an e-mail service provider, it is placed in the proper format for the system, as represented by the FIG. 7 flow diagram box numbered 252. Once the e-mail message has been retrieved, the user is permitted to perform a variety of e-mail handling operations. For example, the user can read the e-mail (that is, display the e-mail message on the display screen of the user remote terminal), print the e-mail message on a remote site printer, delete the e-mail message after reading it, and forward the e-mail message to another recipient at an e-mail mailbox address. These e-mail handling operations are collectively represented in FIG. 7 by the flow diagram box numbered 254.

At regular intervals during the log-on session, the system checks for the end of an e-mail scraping interval. In this way, e-mail received from any one of the registered, monitored e-mail service providers will be checked, retrieved, and formatted, so that the user need not be concerned about missing an e-mail message due to engaging in other terminal operations while logged in. That is, the e-mail scraping function is transparent to the system user. In the preferred embodiment, the system checks for new e-mail messages once every five minutes. If desired, the interval can be changed by the user. The decision box numbered 256 indicates that if the e-mail scraping interval has ended, then processing returns to the flow diagram box numbered 248. If the e-mail scraping interval has not ended, then at the flow diagram box numbered 258 the system continues with other operations in accordance with user actions and processing returns to checking for the end of the e-mail interval at the decision box 256.

The operation of the system illustrated in FIGS. 1 through 7 will be further understood with reference to the display screen representations of FIGS. 8 through 20, which illustrate the features described above.

Figure 8:
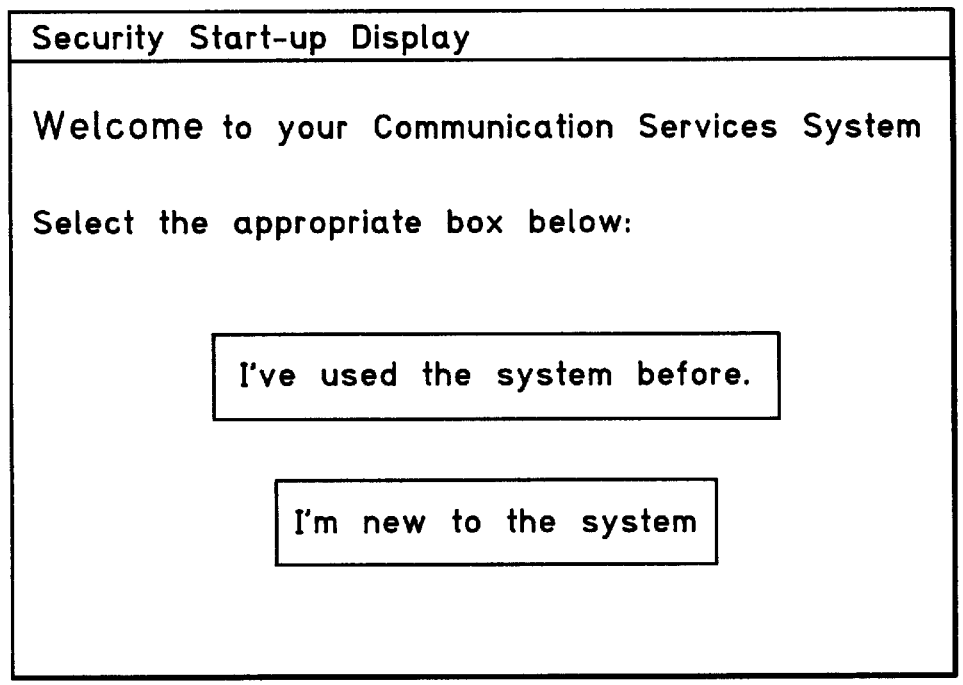
FIG. 8 is a display screen representation showing the security start-up display at one of the terminals illustrated in FIG. 4.

FIG. 8 is a representation of the security start-up display shown at the display screen of a terminal at a remote site. That is, when a user is not actively engaged in using the terminal of a remote site, the processor of that terminal will cause a display such as that illustrated in FIG. 8 to be presented on the display screen. Preferably, the terminal will also include a true screen saver application, which those skilled in the art understand will cause a screen display with movement to be presented in the absence of any user keyboard or display pointer interaction for a predetermined time interval. Those skilled in the art will be well acquainted with screen saver programs, which need no further explanation.

If desired, the screen saver application itself can serve as an "attract mode" moving visual display with a display message that encourages passers-by to use the system. The data necessary to create the display presentation is preferably retrieved from the terminal high speed data storage device after being downloaded from the central control site through the LAN/networking interface. In the preferred embodiment, the central control site will automatically update moving screen display presentations at predetermined intervals to increase terminal attention-attracting and advertising value. Thus, the moving screen saver display can contain seasonal messages or can be tailored to exploit timely local events.

In the preferred embodiment, a user operates the system through a graphical user interface (GUI). Accordingly, the display representation illustrated in FIG. 8 shows a GUI having display buttons, one for selecting an operating option that indicates the user has previously used the system of the invention and one for selecting an operation that indicates the user has not previously used the system of the invention.

Figure 9:
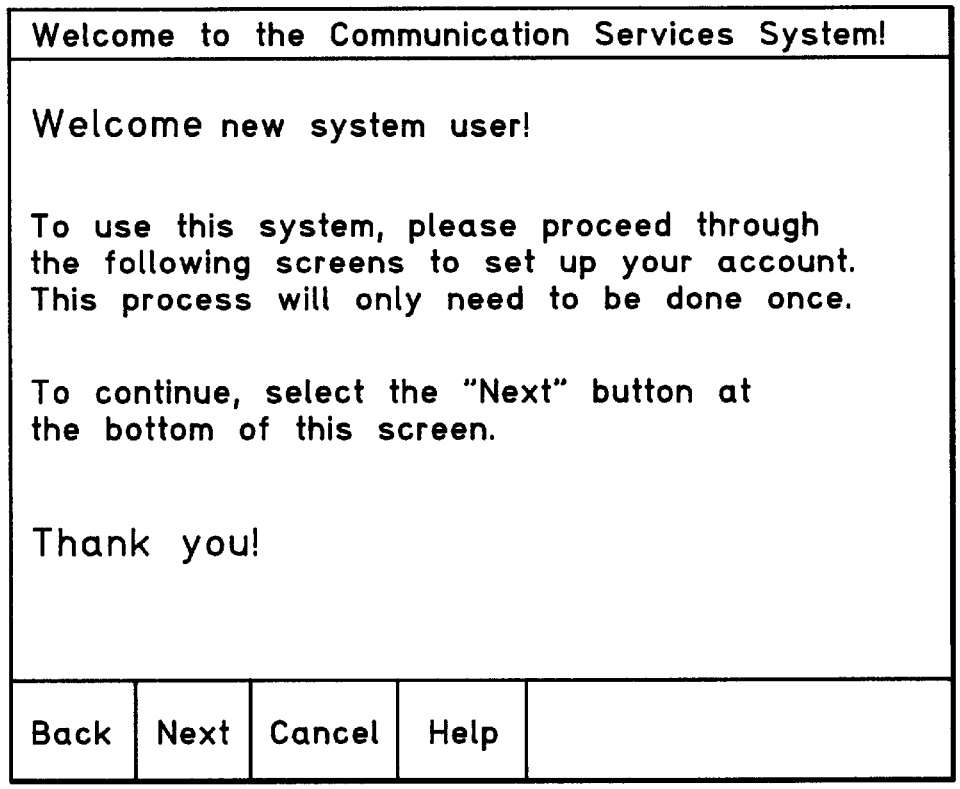
FIG. 9 is a display screen representation showing the instruction screen display at one of the terminals illustrated in FIG. 4.

FIG. 9 is a display representation of the screen display produced in response to a user selecting the "new user" option from the screen saver display shown in FIG. 8. The FIG. 9 new user screen confirms to a user that new user registration and configuration storage processing is about to begin, following selection of the "next" display button at the bottom of the screen display with the display pointer device.

FIG. 10 is a new user data screen display that is presented to the user in response to selection of the "next" button in FIG. 9. The FIG. 10 display prompts the user to enter an identification name with which the user will be associated. The identification name can be the user's given name or a system user name coined by the user. In the preferred embodiment, the user also enters a user password that is not displayed on the screen as it is typed by the user. The password received from a user in a future log-on procedure must match the identification name received with the password in the current log-on session. The password permits greater security for the user and for the system, to prevent unauthorized use of the system and unauthorized access to the user's e-mail.

FIG. 11 shows the payment collection screen display that is presented to the new user in response to selecting the "next" button at the bottom of the FIG. 10 display screen. The payment collection screen prompts the user to slide a credit card through the card reader device. The card reader automatically reads the magnetically encoded credit card information from magnetic strip on the card and displays the information it has read in the display windows indicated in FIG. 11. The charge account identified by the credit card will be charged with the service charges incurred by the user during the log-on session to follow.

Figure 12:
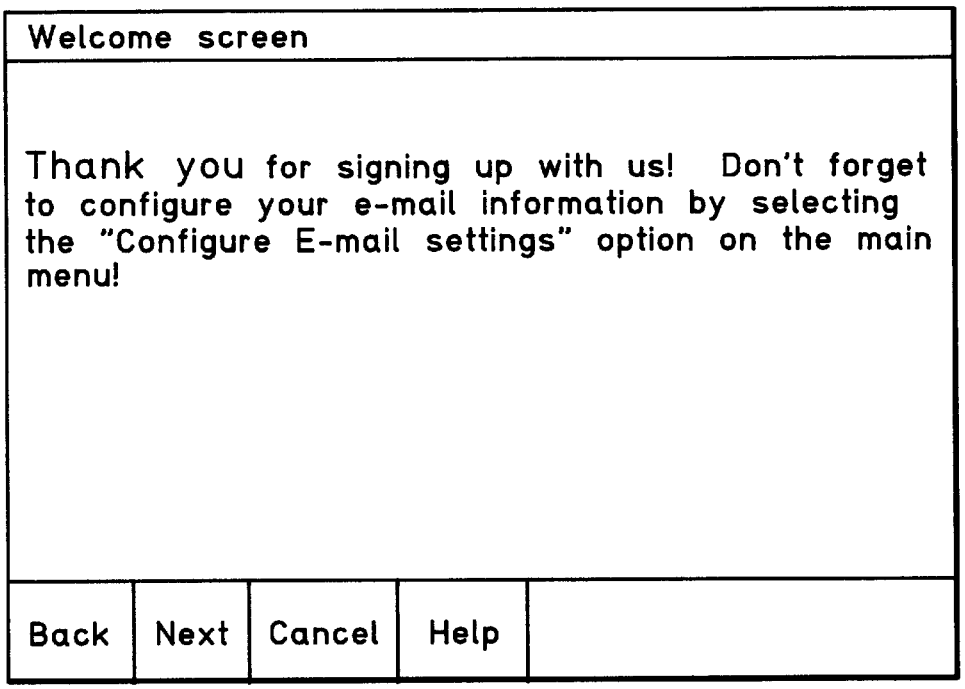
FIG. 12 is a display screen representation showing the configuration storage screen display at one of the terminals illustrated in FIG. 4.

FIG. 12 is the new user welcome screen that is presented to the user after payment has been authorized. FIG. 12 acknowledges the information provided by the user and prompts the user to enter user configuration data through the main menu to follow.

Figure 13:
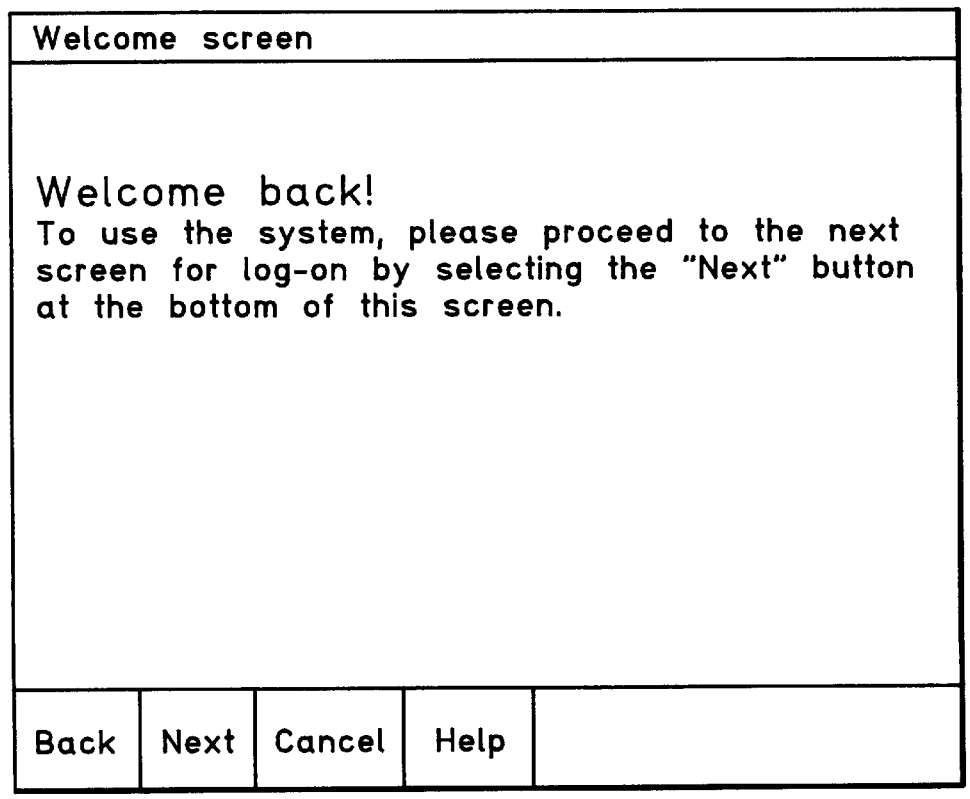
FIG. 13 is a display screen representation showing the existing user acknowledgment screen display at one of the terminals illustrated in FIG. 4.

FIG. 13 is the existing user welcome screen display, which is presented to a user in response to selection of the appropriate window button in the screen saver display of FIG. 8 for identification as an existing user. FIG. 14 is the existing user identification screen that is next presented to the user after the display of FIG. 13 in response to selection of the "next" window display button by the user. In the identification screen the user is requested to provide information to confirm his or her identity. Because FIG. 14 is an existing user screen, the requested information will have already been entered in a previous log-on session. FIG. 14 shows two data entry windows into which the user enters his or her identification name and, in the preferred embodiment, a previously registered password. The identification name and password entered by the user during the current log-on session are compared to the name and password entered previously. If the two match, the user's identity is confirmed and the user can proceed to the next screen.

After confirmation of an existing user's identity or completion of a new user's configuration data entry, a main menu display screen is presented for user selection of further system operation. FIG. 15 is a display screen representation of the main menu at one of the system terminals. The main menu includes display window buttons for system operations that can be easily selected by the user with a GUI display pointing device, such as a track ball, keyboard pointing device, or touch-sensitive screen display pad. Some of the main menu buttons are presented to every user, while other main menu buttons are presented in response to the user configuration data. The main menu displays, in particular, may be remotely changed under control of the configuration server (or administrative server) of the central control site to add or restrict availability of specific system options.

As noted above, the preferred embodiment stores user configuration data at the central control site. When a new user initially registers configuration data, the data may be retained at the remote site until user log-off processing, described further below. Therefore, user configuration data is either retrieved from the central control site at log-on or is used from the initial data entry, and is provided to the remote site processor, which presents the appropriate information in the FIG. 15 display screen format.

In the embodiment illustrated in FIG. 15, the main menu display includes window buttons for a World Wide Web browser identified as the "Internet Explorer" from the Microsoft Corporation, an Internet news service identified as "News Agent", a games group of application programs, an e-mail display service, and an on-line service provider identified as "AOL" for "America On-Line". The e-mail display service may comprise, for example, the "MS Exchange" application software from Microsoft Corporation, in conjunction with special purpose system software for operation of "MS Exchange" in the environment of the communication system. The display also includes system configuration setting buttons that comprise a button to initiate changing the account settings, a button to initiate user log-off from the system, and a button to initiate changing the e-mail settings. Of these buttons, the World Wide Web browser, Internet news service, games, and system configuration setting buttons are typically presented to every user. The e-mail service provider and on-line service provider buttons shown in FIG. 15 (AOL, MS Exchange E-mail) have been presented in response to the user's configuration data. That is, the system has confirmed that the identified user has subscriber accounts with each of these services and therefore buttons for selection of these services are presented to this user.

If a user selects the e-mail configuration setting screen of the FIG. 15 display, then the user will next be presented with the FIG. 16 display, which is entitled "E-mail Configuration Wizard". The FIG. 16 display confirms to a user that e-mail configuration processing will next be performed. If a user selected the e-mail configuration button by mistake, the user can return to the main menu display of FIG. 15 by selecting the "return" button at the bottom of the FIG. 16 display screen. The user can select the format in which e-mail messages will be presented on the terminal display screen through the features of the FIG. 16 screen. The user confirms his or her formatted e-mail configuration by selecting the "next" button at the bottom of the screen.

FIG. 17 is a representation of the Internet e-mail mailbox screen presented to the system user in response to selection of the "next" button in FIG. 16. The screen of FIG. 17 comprises the display screen through which the user registers Internet e-mail network service providers. FIG. 17 includes two display data entry areas, one entitled personal information and the other entitled mailbox information. FIG. 17 provides the user with the option of selecting a button marked "I don't have an Internet provider account." Selecting this button will generate a sequence of display screens in which the user will be able to use the system as the user's personal e-mail interface. That is, the system user will be assigned an Internet address in the conventional domain name configuration through the central control site of the system. The user can then send and receive e-mail messages through the facilities of the system provider. In this way, users who have no e-mail access can gain Internet access through the system provider e-mail mailbox. The format of the display screens to collect the necessary information will depend on the regional Internet service provider being used by the system provider and therefore are not illustrated.

FIG. 18 shows the e-mail display screen, whose configuration is selected by the user and in which e-mail messages are displayed. A row of display window screen buttons provides user operations of compose, send, reply, and delete for messages. A lower display window area provides the display area into which e-mail sender information, e-mail message text, and received time and day indicators are placed. In the preferred embodiment, some features of the e-mail display screen can be selected by the user, such as relative window sizing and placement, display colors, font, and the like. Such settings are part of the user configuration data maintained at the central control site and are modified through the e-mail configuration wizard screen described previously. The FIG. 18 e-mail display format is used for all e-mail retrieved by the system. Thus, when the system collects e-mail messages from the various electronic sources registered by the system user, the system processes each e-mail message so the message conforms to the system data representation and the format selected by the user. Such processing can include, for example, removing data packet information of the service provider, adding header information used by the system of the invention, changing between an ASCII-standard character representation format to an EBCIDIC-standard format, and similar conversions. Typically, readily available e-mail message retrieval and interface software for one or more e-mail service providers can be used, along with special purpose software for proper operation of the interface software according to the unique environment of the communication system.

In the preferred embodiment, selecting the "change account" button from the FIG. 15 main menu screen permits changing not only the user identification and charge account information, but also permits changing the user configuration information comprising the various services with which the user is a subscriber. FIG. 19 shows a "CompuServe" display screen that is displayed in response to selecting the "change account" button of the main menu. That is, the user may be a CompuServe subscriber who initially declined to register the CompuServe service with the system for automatic e-mail checking or perhaps the user has no CompuServe account. Selecting the "change account" button of FIG. 15 and selecting "CompuServe" from a list of service providers for whom there is an interface (not illustrated) might result in the user being shown the display of FIG. 19 to supply service provider information.

FIG. 19 shows that the user can add the CompuServe subscriber information after beginning the log-on session. FIG. 19 shows that the user also can select the button marked "I don't have a CS account" causing the system to bypass CompuServe e-mail processing. Other on-line services (and other network service providers) can be presented to the system user by selecting the "next" button at the bottom of FIG. 19 (or at the bottom of whatever screen is next displayed).

Figure 20:
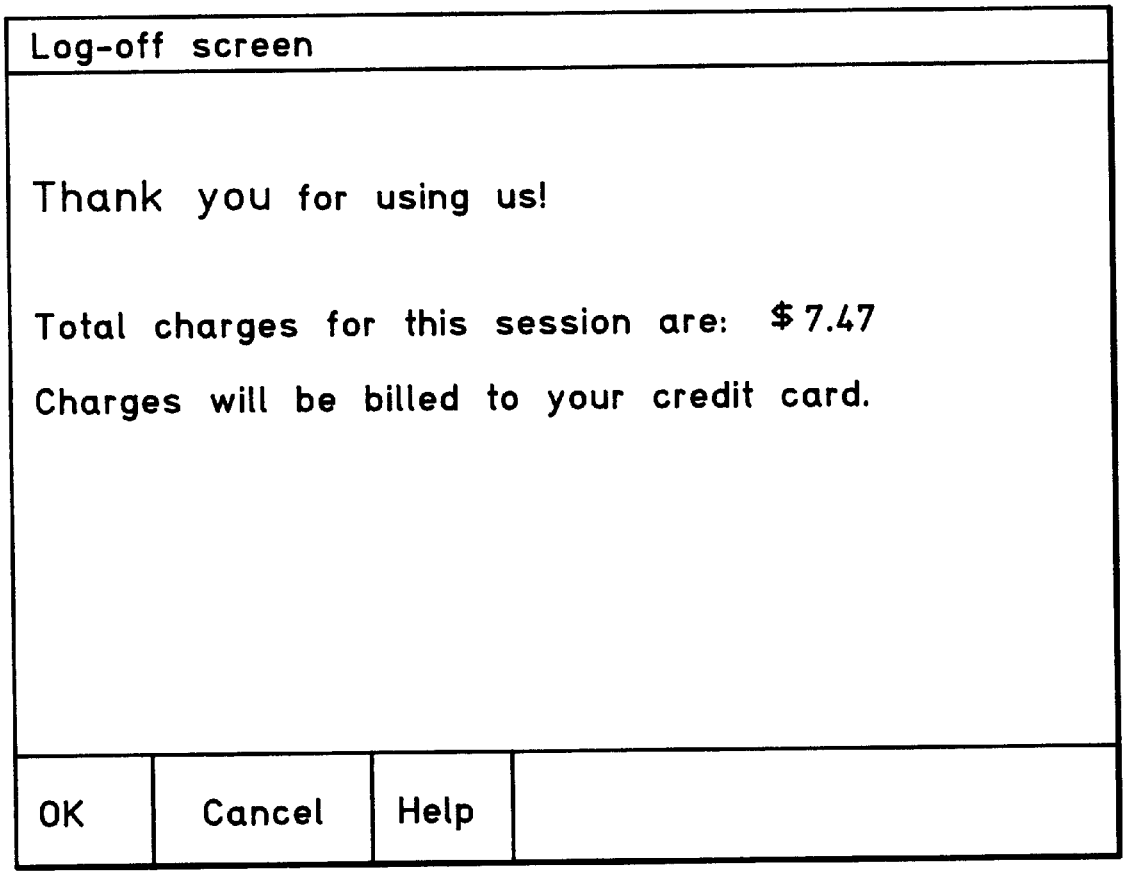
FIG. 20 is a display screen representation showing the log-off screen display at one of the terminals illustrated in FIG. 4.

When a user has completed desired processing of a log-on session, the user can initiate a log-off process. The initiation of the process can occur in response to the user pressing a predetermined keyboard button from any display screen, such as the "Esc" key or the like, or can occur in response to the user selecting the "log-off" button from the main menu display screen of FIG. 15. In response to the user initiating log-off processing, the system calculates the amount of connect time to charge the user, saves any changed user configuration data received, and displays the total charge to the consumer. FIG. 20 represents the log-off screen display presented to the user. If preferred, the last screen can be replaced after a predetermined period of terminal inactivity by a screen saver display such as that discussed above. Alternatively, the replacement screen can incorporate targeted user data that is presented by the remote site processor in response to user demographic data, local conditions of which the processor has been informed, or some other predetermined message designed to attract the next passerby to use the system terminal.

The present invention has been described above in terms of a presently preferred embodiment so that an understanding of the present invention can be conveyed. There are, however, many configurations for computer network communication systems not specifically described herein but with which the present invention is applicable. The present invention should therefore not be seen as limited to the particular embodiment described herein, but rather, it should be understood that the present invention has wide applicability with respect to network communication systems generally. All modifications, variations, or equivalent arrangements that are within the scope of the attached claims should therefore be considered to be within the scope of the invention.

We claim:

1. A method of providing a communication between a remote site computer and a content provider using a central server and displaying advertising at the remote site, comprising the steps of:

initiating a log-on session at the remote site computer;

collecting user identification information from a user at the remote site computer;

communicating the user identification information from the remote site computer to the central server;

retrieving user configuration information from the central server to the remote site computer, based on the user identification information;

the central server communicating with said content provider based on the user identification information and the user configuration information;

terminating the log-on session; and displaying session charge information and said advertising on said remote site computer.

2. The method of claim 1, wherein the step of collecting comprises collecting information selected from a group including: charge account information user identifying information, user e-mail account identifying information, content provider identifying information, security information and payment method information.

3. The method of claim 1 further comprising the step of storing in the central server the user information collected in the collecting step.

4. The method of claim 1, wherein the step of the central server communicating with said content provider comprises:

establishing communication between the central server and said content provider;

providing user account information to said content provider based on at least one of said user identification information and said user configuration information; and receiving data from the content provider.

5. The method of claim 4 wherein the step of receiving data is repeated at predetermined intervals for the duration of the log-on session with the central control computer.

6. Them method of claim 4 wherein said data received from each said content provider includes e-mail messages.

7. The method of claim 6, further comprising:

converting the e-mail messages from said content provider from a first format to a second format;

displaying the e-mail messages in the second format on said remote site computer.

8. The method of claim 6 further comprising a step of requesting e-mail data from the content provider and wherein the steps of requesting e-mail data and receiving data are repeated at predetermined intervals.

9. The method of claim 4 wherein at least one of said content providers is a World Wide Web content server.

10. The method of claim 9 wherein said data received from each said content provider includes web page content.

11. The method of claim 1 wherein the step of the central server communicating with the content provider comprises:

establishing communication with the content provider;

providing user account information to the content provider; and receiving data from content provider for presentation to the user.

12. The method of claim 1, wherein said method provides communication between said remote site computer and a plurality of content providers using the central server, wherein:

the step of retrieving user information includes retrieving user information pertaining to each of said content providers; and the step of the central server communicating comprises the central server communicating with each of said content providers based on user configuration information pertaining to the respective content provider.

13. The method of claim 1, the remote site computer including a display device, the method further comprising:

ending the log-on session; and displaying a first visual display on the display device of the remote site computer.

14. The method of claim 13 further comprising sending a signal from the central server to the remote site computer following the displaying step, said signal including display instructions.

15. The method of claim 14 further comprising displaying a second visual display on the display device of the remote site computer in response to the signal sent from the central server to the remote site computer in the sending step.

16. The method of claim 13 further comprising sending visual display control signal from the central server to the remote site computer at predetermined intervals.

17. The method of claim 13 further comprising displaying a second visual display on the display device of the remote site computer after a predetermined period has elapsed after the step of displaying the first visual display.

18. A method of operating a server computer of a network, to which are connected a plurality of computer terminals, the method comprising the steps of:

receiving a first set of user information at the control computer from a first user at one of the computer terminals sufficient to identify a user account to be debited for billing purposes;

verifying the first set of user information for authorization and beginning a network log-on session by the first user;

retrieving a second set of user information from a storage device in communication with the server computer, the second set of user information including user account information for the first user;

establishing communication between the first user computer and one or more network service providers in accordance with information selected from a group including the first set of user information and the second set of user information;

providing user account information to each respective network service provider;

receiving data from the network service providers for presentation to the first user;

ending the network log-on session; and transmitting user configuration information from the first user computer to the server computer and displaying session charge information at the first computer.

19. A method of operating a server computer of a network, to which are connected a plurality of computer terminals, the method comprising the steps of:

receiving a first set of user information at the control computer from a first user at one of the computer terminals sufficient to identify a user account to be debited for billing purposes;

verifying the first set of user information for authorization and beginning a network log-on session by the first user;

retrieving a second set of user information from a storage device in communication with the server computer, the second set of user information including user account information for the first user;

establishing communication between the first user computer and one or more network service providers in accordance with information selected from a group including the first set of user information and the second set of user information;

providing user account information to each respective network service provider;

receiving data from the network service providers for presentation to the first user;

ending the network log-on session; and transmitting user configuration information from the first user computer to the server computer and displaying session charge information at the first computer;

wherein said method provides communication between said remote site computer and a plurality of content providers using the central server, wherein:

the step of retrieving user information includes retrieving user information pertaining to each of said content providers; and the step of the central server communicating comprises the central server communicating with each of said content providers based on user identification information pertaining to the respective content provider.

20. The method of claim 19 further comprising:

establishing communication between the central server and each said content provider;

providing user account information to each of said content providers based on said user information pertaining to the respective content provider; and receiving data from each said content provider if any is available for the user from that content provider.

21. The method of claim 20 wherein said data received from each said content provider includes e-mail messages.

22. The method of claim 21 further comprising a step of requesting e-mail data from each of said content providers and wherein the steps of requesting e-mail data and receiving data are repeated at predetermined intervals.

23. The method of claim 21, further comprising:

placing the e-mail messages from each content provider into a common format;

displaying the e-mail messages in the common format on said remote site computer.

24. The method of claim 23, wherein the step of displaying includes displaying the messages in the common format on a display screen.

25. The method of claim 20 wherein at least one of said content providers is a World Wide Web content server.

26. The method of claim 25 wherein said data received from each said content provider includes web page content.

27. The method of claim 20 wherein the step of receiving data is repeated at predetermined intervals.

28. An apparatus providing communication between a remote site computer and a content provider using a central server, the apparatus comprising:

means for communicating user identification information from the remote site computer to the central server and beginning a log-on session;

means for retrieving user configuration information from the central server, based on the user identification information;

means for the central server to communicate with said content provider based on the user identification information and the user configuration information;

means for terminating the log-on session; and means for displaying the advertising and session charge information on said remote site computer.

29. The apparatus of claim 28 wherein the means for the central server to communicate with said content provider comprises:

means for establishing communication between the central server and said content provider;

means for providing user account information to said content provider based on at least one of said configuration information and said user configuration information; and means for receiving data from the content provider.

30. The apparatus of claim 28, said apparatus providing communication between said remote site computer and a plurality of content providers using the central server, wherein:

the means for retrieving user information includes means for retrieving user information pertaining to each of said content providers; and the means for the central server to communicate comprises means for the central server to communicate with each of said content providers based on user identification information pertaining to the respective content provider.

31. The apparatus defined in claim 30 further comprising:

means for establishing communication between the central server and each said content provider;

means for providing user account information to each of said content providers based on said user information pertaining to the respective content provider; and means for receiving data from each said content provider if any is available for the user from that content provider.

32. The apparatus of claim 31 wherein said data received from each said content provider includes e-mail messages.

* * * * *